United States Patent
Agranonik et al.

(10) Patent No.: US 10,521,587 B1
(45) Date of Patent: Dec. 31, 2019

(54) DETECTING CODE OBFUSCATION USING RECURRENT NEURAL NETWORKS

(71) Applicant: EMC IP Holding Company LLC, Hopkinton, MA (US)

(72) Inventors: Arie Agranonik, Herzelia (IL); Zohar Duchin, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 295 days.

(21) Appl. No.: 15/665,330

(22) Filed: Jul. 31, 2017

(51) Int. Cl.
*G06F 21/60* (2013.01)
*G06F 21/56* (2013.01)
*G06N 3/04* (2006.01)
*G06F 21/55* (2013.01)

(52) U.S. Cl.
CPC .......... *G06F 21/563* (2013.01); *G06F 21/554* (2013.01); *G06N 3/0445* (2013.01); *G06F 2221/034* (2013.01)

(58) Field of Classification Search
CPC ...... G06F 21/56; G06F 21/55; G06F 2221/03; G06N 3/04
See application file for complete search history.

(56) References Cited

U.S. PATENT DOCUMENTS

| | | | | |
|---|---|---|---|---|
| 2016/0307094 | A1* | 10/2016 | Davis | G06F 21/564 |
| 2016/0350652 | A1* | 12/2016 | Min | G06F 17/24 |
| 2017/0262996 | A1* | 9/2017 | Jain | G06T 7/143 |

OTHER PUBLICATIONS

Daniel Bohannon, "PowerShell Obfuscator," https://github.com/danielbohannon/Invoke-Obfuscation, 2017, 5 pages.
Javascript, "Javascript-Obfuscator," https://github.com/javascript-obfuscator/javascript-obfuscator, 2017, 13 pages.
Symantec, "The Increased Use of Powershell in Attacks—V1.0," https://www.symantec.com/content/dam/symantec/docs/security-center/white-papers/increased-use-of-powershell-in-attacks-16-en.pdf, 2016, 37 pages.
D. Amodei et al., "Deep Speech 2: End-to-End Speech Recognition in English and Mandarin," Proceedings of the 33rd International Conference on Machine Learning (ICML), Jun. 19-24, 2016, pp. 178-182, vol. 48.

(Continued)

*Primary Examiner* — Wasika Nipa
(74) *Attorney, Agent, or Firm* — Ryan, Mason & Lewis, LLP (57) ABSTRACT

A method includes generating an index representation of characters of code of a given file and mapping the index representation to a vector space providing contextual representation of the characters utilizing an embedding layer of a recurrent neural network (RNN). The method also includes identifying one or more code features in the mapped index representation utilizing at least one hidden layer of the RNN, detecting sequences of the identified code features in the mapped index representation utilizing a plurality of memory units of a recurrent layer of the RNN, and generating a classification result for the given file based on the detected sequences of code features utilizing one or more classification layers of the RNN. The method further comprises utilizing the classification result to determine if the given file contains code of a designated code type, and modifying access by a given client device to the given file responsive to the determination.

20 Claims, 8 Drawing Sheets

(56) References Cited

OTHER PUBLICATIONS

T. Mikolov et al., "Distributed Representations of Words and Phrases and Their Compositionality," Proceedings of the 26th International Conference on Neural Information Processing Systems (NIPS), Dec. 5-10, 2013, pp. 3111-3119.
H. Bourlard et al., "Connectionist Speech Recognition: A Hybrid Approach," Kluwer Academic Publishers, 1994, 291 pages.
A. Graves et al., "Framewise Phoneme Classification with Bidirectional LSTM and Other Neural Network Architectures," Neural Networks, Jun. 2005, pp. 602-610, vol. 18, Nos. 5-6.
I. Sutskever et al., "Sequence to Sequence Learning with Neural Networks," Proceedings of the 27th International Conference on Neural Information Processing Systems (NIPS), Dec. 8-13, 2014, pp. 3104-3112.
J. Chung et al., "Empirical Evaluation of Gated Recurrent Neural Networks on Sequence Modeling," Workshop on Deep Learning, (NIPS), Dec. 2014, 10 pages.
T. N. Sainath et al., "Convolutional, Long Short-Term Memory, Fully Connected Deep Neural Networks," IEEE International Conference on Acoustics, Speech and Signal Processing (ICASSP), Apr. 19, 2015, pp. 4580-4584.
Quora, "What are the Advantages and Disadvantages of Deep Learning? Can You Compare it with the Statistical Learning Theory?" https://www.quora.com/What-are-the-advantages-and-disadvantages-of-deep-learning-Can-you-compare-it-with-the-statistical-learning-theory, Jul. 28, 2017, 2 pages.
A. Kaphaty, "The Unreasonable Effectiveness of Recurrent Neural Networks," http://karpathy.github.io/2015/05/21/rnn-effectiveness/, May 21, 2015, 24 pages.
A. Krizhevsky et al., "ImageNet Classification with Deep Convolutional Neural Networks," Proceedings of the 25th International Conference on Neural Information Processing Systems (NIPS), Dec. 3-6, 2012, pp. 1097-1105.
V. Nair et al., "Rectified Linear Units Improve Restricted Boltzmann Machines," Proceedings of the 27th International Conference on Machine Learning (ICML-10), 2010, pp. 807-814.

\* cited by examiner

| Category | Description |
| --- | --- |
| Token / String | Obfuscate string tokens. For example, cut all strings to sub strings and combine using concatenation commands. |
| Token / command | Obfuscate all language command tokens. |
| Token / argument | Obfuscate all arguments to functions. |
| Token / member | Obfuscate all member tokens in a script. |
| Token / variable | Obfuscate all variables. |
| Token / Type | Obfuscate all type tokens. |
| Token / comment | Remove all comments. |
| Token / whitespace | Insert random whitespace into script. |

|  | PREDICTED | |
|---|---|---|
| ACTUAL | TP=747 | FN=54 |
|  | FP=12 | TN=902 |

DETECTING CODE OBFUSCATION USING RECURRENT NEURAL NETWORKS

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats of this type include malware. Malware can pose a threat to an individual user and that user's devices, as well as possibly threatening an entity associated with the user. Users or members of an entity can become victims of malware-based attacks through a variety of different infection vectors including but not limited to visiting suspicious web sites, connecting machines or devices to untrusted networks, using infected universal serial bus (USB) drives, opening malicious e-mail or other attachments, etc.

SUMMARY

Illustrative embodiments of the present invention provide techniques for the detecting designated types of code in files such as software scripts, including obfuscated code.

In one embodiment, a method comprises generating an index representation of characters in at least a given portion of code of a given file and mapping the index representation to a vector space providing contextual representation of the characters utilizing an embedding layer of a recurrent neural network. The method also comprises identifying one or more code features in the mapped index representation utilizing at least one hidden layer of the recurrent neural network and detecting sequences of the identified code features in the mapped index representation utilizing a plurality of memory units of a recurrent layer of the recurrent neural network, such as a plurality of long short-term memory (LSTM) cells arranged in a bi-directional network. The method further comprises generating a classification result for the given file based on the detected sequences of code features utilizing one or more classification layers of the recurrent neural network, utilizing the classification result to determine if the given file contains code of a designated code type, and modifying access by a given client device to the given file responsive to determining that the given file contains code of the designated code type. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
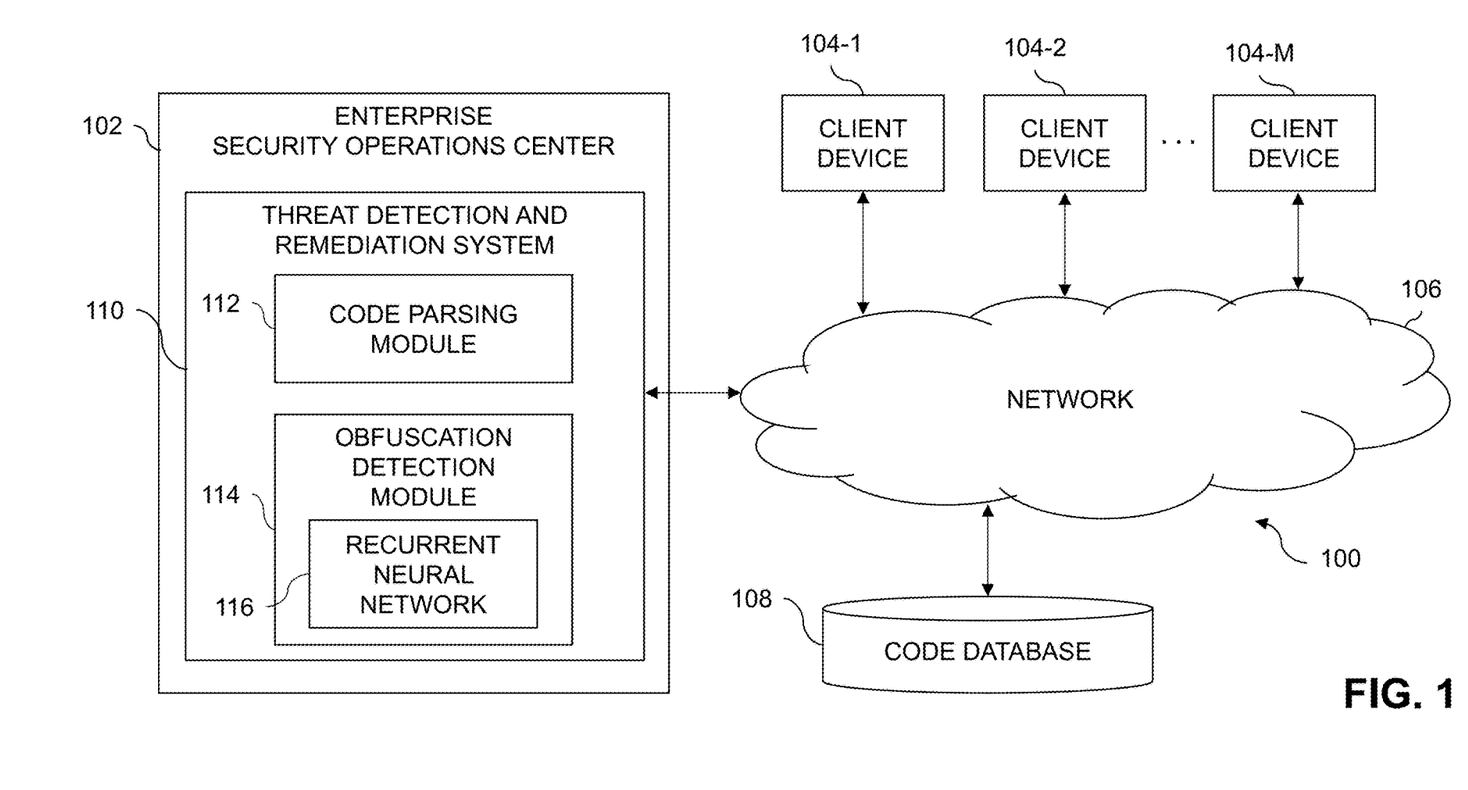
FIG. 1 is a block diagram of an information processing system for detecting code obfuscation in an illustrative embodiment of the invention.

FIG. 1 shows an information processing system 100 configured in accordance with an illustrative embodiment. The information processing system 100 is assumed to be built on at least one processing platform and provides functionality for detecting code obfuscation utilizing recurrent neural networks (RNNs). In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is a code database 108, which may store information relating to software or programming code, such as scripts which contain obfuscated or non-obfuscated code.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The code database 108, as discussed above, is configured to store and record information for detecting code obfuscation. In some embodiments, the code database 108 includes samples of code that is obfuscated and non-obfuscated used for training an RNN to detect code obfuscation. The samples of code may be in the form of scripts or other files containing obfuscated or non-obfuscated code.

The code database 108 in some embodiments is implemented using one or more storage devices associated with the enterprise SOC 102. Such storage devices may comprise, for example, storage products such as VNX® and Symmetrix VMAX® storage arrays, software-defined storage products such as ScaleIO™ and ViPR®, flash-based storage arrays, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security or host agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking access to one or more scripts or other files classified as containing obfuscated code, removing scripts or other files from one or more of the client devices 104 classified as containing obfuscated code, requiring scripts or other files classified as containing obfuscated code to be run in a sandboxed or other protected environment on one or more of the client devices 104, requiring user input or authentication to obtain or run one or more scripts or other files classified as containing obfuscated code, triggering further review of scripts or other files classified as containing obfuscated code to determine maliciousness, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 110. As will be described in further detail below, the threat detection and remediation system 110 is configured to detect code obfuscation in various use case scenarios.

In some embodiments, the threat detection and remediation system 110 provides a file analysis service for users of the client devices 104. A user of one of the client devices 104 can send a file, such as a script, to the threat detection and remediation system 110, which will analyze the file using the deep learning models described herein to determine if the file contains obfuscated code or exhibits some other defined characteristic. Knowing whether a file has been obfuscated, for example, may be a critical feature which causes various remedial actions to be taken, such as performing further analysis to determine maliciousness. In some cases, a file may be classified as potentially malicious responsive to determining that it contains obfuscated code, which triggers remedial action that modifies access by one or more of the client devices 104 to the file.

The threat detection and remediation system 110 may also provide a network or log monitoring tool, which looks for files such as scripts in network traffic of the network 106 from client devices 104. Such files may be analyzed using the deep learning models described herein to determine if the files contain obfuscated code or exhibit some other defined characteristic. Responsive to determining that a given file contains obfuscated code, for example, various remedial actions may be taken including conducting further analysis to determine maliciousness or modifying access by one or more of the client devices 104 to the given file.

The threat detection and remediation system 110 may also be implemented as an endpoint monitoring tool to look for files in the file system or memory of one or more of the client devices 104. Such functionality, in some embodiments, may be implemented via a user or security agent on one or more of the client devices 104. The endpoint monitoring tool may also provide a pre-execution check, where files such as scripts are checked for code obfuscation before they are run.

It is to be noted that the use cases described above are presented by way of example only, and that embodiments are not limited to these specific use cases.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110. In the FIG. 1 embodiment, the threat detection and remediation system 110 comprises a code parsing module 112 and an obfuscation detection module 114 implementing an RNN 116.

The code parsing module 112 is configured to receive a given file comprising computer or programming code, and to generate an index representation of characters in at least a given portion of the code of the given file.

The obfuscation detection module 114 is configured to detect whether the given portion of the code comprises code of a designated code type, such as obfuscated code, using the RNN 116. An embedding layer of the RNN 116 is used to map the index representation generated by the code parsing module 112 to a vector space providing contextual representation of the characters. At least one hidden layer of the RNN 116, such as a sequence of convolutional layers, is used to identify one or more code features in the mapped index representation. A plurality of memory units of a recurrent layer of the RNN 116, such as a plurality of long short-term memory (LSTM) cells arranged in a bi-directional network, detects sequences of the identified code features in the mapped index representation. Each LSTM cell is configured to remember values for long or short time periods, and does not utilize an activation function as part of its recurrent components. As such, the value or values stored in the LSTM cells are not iteratively squashed over time alleviating the vanishing gradient problem. One or more classification layers of the RNN 116, such as a fully connected layer and an output layer, are used to generate a classification result for the given file based on the detected sequences of code features.

The obfuscation detection module 114 is further configured to utilize the classification result to determine if the given file contains code of the designated code type, and to modify access by a given client device 104 to the given file responsive to determining that the given file contains code of the designated code type.

Additional details regarding the code parsing module 112 and obfuscation detection module 114 will be described in further detail below with respect to FIGS. 2-6.

It is to be appreciated that the particular arrangement of the enterprise SOC 102, threat detection and remediation system 110, code parsing module 112 and obfuscation classification module 114 illustrated in the FIG. 1 embodiment is presented by way of example only, and alternative arrangements can be used in other embodiments. As discussed above, for example, the enterprise SOC 102, threat detection and remediation system 110, code parsing module 112 and/or obfuscation detection module 114 may in some embodiments be implemented internal to one or more of the client devices 104. As another example, the functionality associated with the code parsing module 112 and the obfuscation detection module 114 may be combined into one module, or separated across more than two modules with the multiple modules possibly being implemented with multiple distinct processors or processing devices.

At least portions of the code parsing module 112 and the obfuscation detection module 114 may be implemented at least in part in the form of software that is stored in memory and executed by a processor.

It is to be understood that the particular set of elements shown in FIG. 1 for the detection of code obfuscation is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC), a security analytics system, a security information and event management (STEM) system, etc.

The threat detection and remediation system 110 and other portions of the system 100, as will be described in further detail below, may be implemented at least in part using one or more processing platforms including public or private cloud infrastructure, or other distributed virtual infrastructure.

Figure 2:
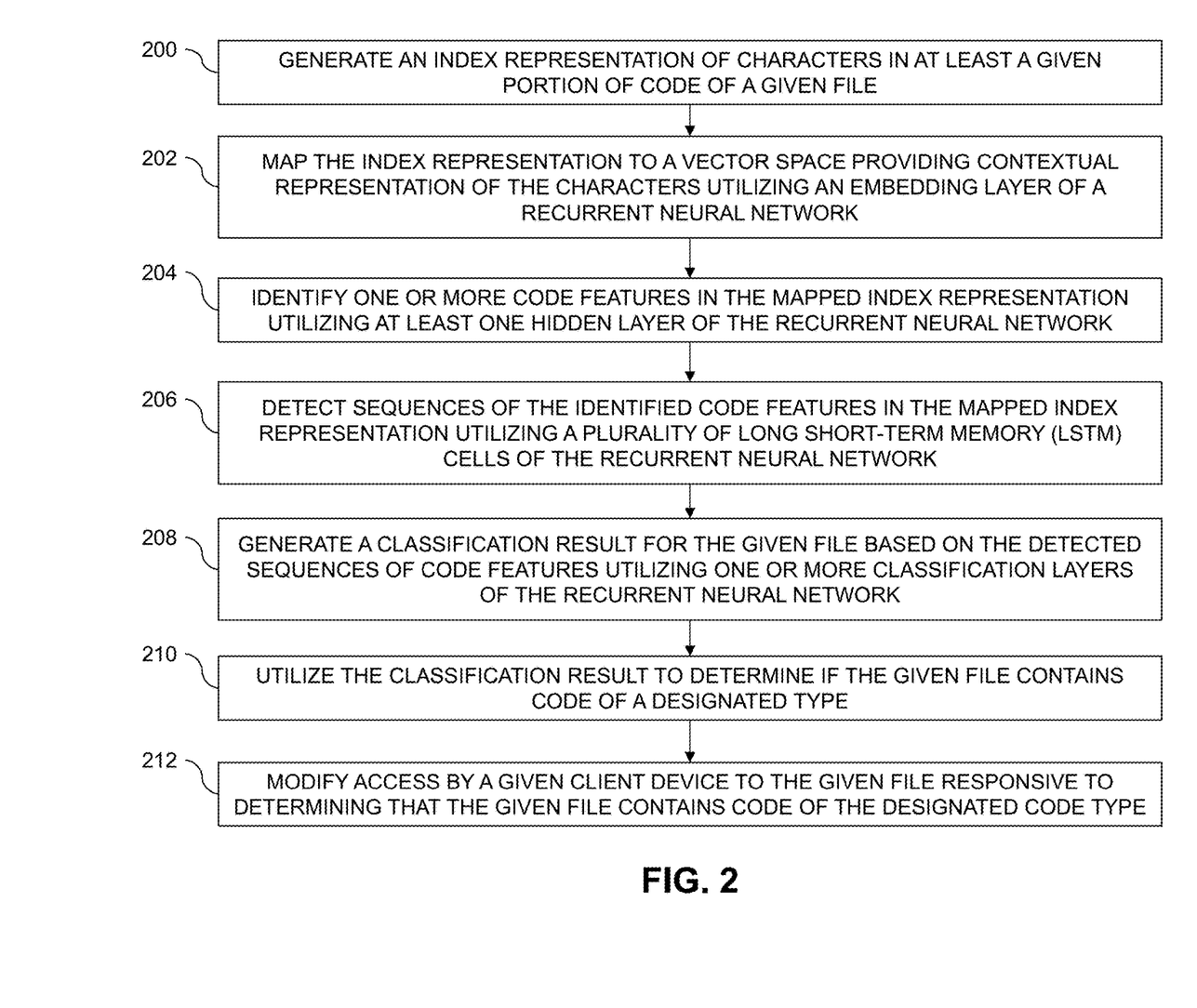
FIG. 2 is a flow diagram of an exemplary process for detecting code obfuscation in an illustrative embodiment.

An exemplary process for detecting code obfuscation will now be described in more detail with reference to the flow diagram of FIG. 2. It is to be understood that this particular process is only an example, and that additional or alternative processes for detecting code obfuscation or more generally detecting code of one or more designated code types can be carried out in other embodiments.

In this embodiment, the process includes steps 200 through 212. These steps are assumed to be performed by the threat detection and remediation system 110 utilizing the code parsing module 112 and the obfuscation detection module 114. The process begins with step 200, generating an index representation of characters in at least a given portion of code of a given file. The given file may comprise a script file. Generating the index representation in step 200 may include creating a corpus of each character in the code of a plurality of files including the given file, assigning an index to each character in the corpus, and generating an array comprising indexes of the corpus which correspond to the characters in the given portion of the code of the given file. In some embodiments, the given portion of the code of the given file comprises a designated number of characters of the code of the given file less than all of the characters of the code of the given file.

The process continues with step 202, mapping the index representation to a vector space providing contextual representation of the characters utilizing an embedding layer of an RNN. In some embodiments, the embedding layer is configured to map the index representation to the vector space by representing each character in the given portion of the code of the given file in a vector of scalars, wherein the vector of scalars assigns similar values to characters that have higher probability to follow or be followed by another character in code having the designated code type. By similar values, it is meant that a distance between the values assigned to characters is proportional to the probability that such characters follow or are followed by other characters in code of the programming language of the given file having the designated code type. Consider, for example, a first character with a first relatively high probability to follow or be followed by other characters of a designated code type, a second character with a second relatively high probability to follow or be followed by other characters of the designated code type, and a third character with a relatively low probability to follow or be followed by other characters of the designated code type. The distance between the values assigned to the first character and the second character will be smaller than the distance between values assigned to the first character and the third character and the distance between values assigned to the second character and the third character.

In step 204, one or more code features in the mapped index representation are identified using at least one hidden layer of the RNN. The at least one hidden layer may comprise a sequence of two or more hidden layers each comprising a convolutional layer. The convolutional layers may each comprise two or more convolutional filters configured to activate in response to detecting a corresponding code feature in the mapped index representation. In some embodiments, the convolutional layers apply Rectified Linear Units (ReLU) activation functions to their respective outputs. Each convolutional layer may be associated with a dropout layer configured to drop out random sets of activations in the convolutional layer, as well as a pooling layer configured to provide non-linear down-sampling of the output of that convolutional layer.

Sequences of the code features identified in the mapped index representation in step 204 are detected utilizing a plurality of memory units in a recurrent layer of the RNN in step 206. In some embodiments, the plurality of memory units in the recurrent layer comprise a plurality of LSTM cells arranged in a bi-directional network.

In step 208, a classification result for the given file is generated based on the detected sequences of code features utilizing one or more classification layers of the RNN. The one or more classification layers may comprise a fully connected layer comprising neurons with connections to each of the plurality LSTM cells, and an output layer comprising at least one neuron that generates a representation of a confidence level of the RNN in classifying the given portion of the code of the given file as comprising code of the designated code type.

The classification result obtained in step 208 is utilized to determine if the given file contains code of a designated code type in step 210. In step 212, access by a given client device to the given file is modified responsive to determining that the given file contains code of the designated code type. The designated code type may comprise obfuscated code. Modifying access in step 212 may comprise one or more of removing the given file from a memory or storage of the given client device, preventing the given client device from obtaining the given file, and causing the given file to be opened in a sandboxed application environment on the given client device. Various other remedial actions may be taken, including prompting further review of obfuscated code to determine its maliciousness, in other embodiments.

Detecting code obfuscation poses significant challenges, in that various different techniques may be used to obfuscate code. Such techniques, in some cases, may be specific to different programming languages. In some embodiments, an LSTM RNN with character-level sequence modeling is used to distinguish between valid or non-obfuscated code and obfuscated code. Various embodiments will be described herein with respect to classifying software scripts, but embodiments are more generally applicable to classifying programming code.

RNN and LSTM-based character level models provide promising results for predicting language text generation. Advantages of an LSTM RNN network include the ability to remember sequences better than "memoryless" models, such as feed-forward models. RNN and LSTM-based character level models described herein provide superior results relative to memoryless models, and provide very high precision and recall. In some embodiments, combinations of recurrent and convolutional layers are used in a deep neural network. For testing, a model with six core layers and 800,000 parameters was used to learn a meaningful representation of a single programming language. Results for test data using PowerShell code will be described in further detail below.

Script obfuscation, and more generally code obfuscation, is a common technique to hide implementation details when using scripting or programming languages. Since plaintext scripts are passed for execution, and it is not possible to use a compiler, many scripting languages use obfuscation for delivery to production. Obfuscation may also be used to reduce bandwidth consumption when transmitting scripts.

While obfuscation may be used for legitimate purposes, obfuscation is also commonly used in malware, such as in malware taking the form of scripts using the PowerShell or VB Script languages. PowerShell is a framework by Microsoft for task automation and configuration management. VBScript, short for Microsoft Visual Basic Scripting Edition, is a scripting language modeled on Visual Basic, providing tools for managing computers with advanced programming constructs. Malware authors often require concealment of their payload, and thus are likely to use obfuscation. For PowerShell, reports have shown that 8% of available scripts appear to be obfuscated, the vast majority of which are malicious. Various techniques may be used to validate the maliciousness of obfuscated scripts.

Figure 3:
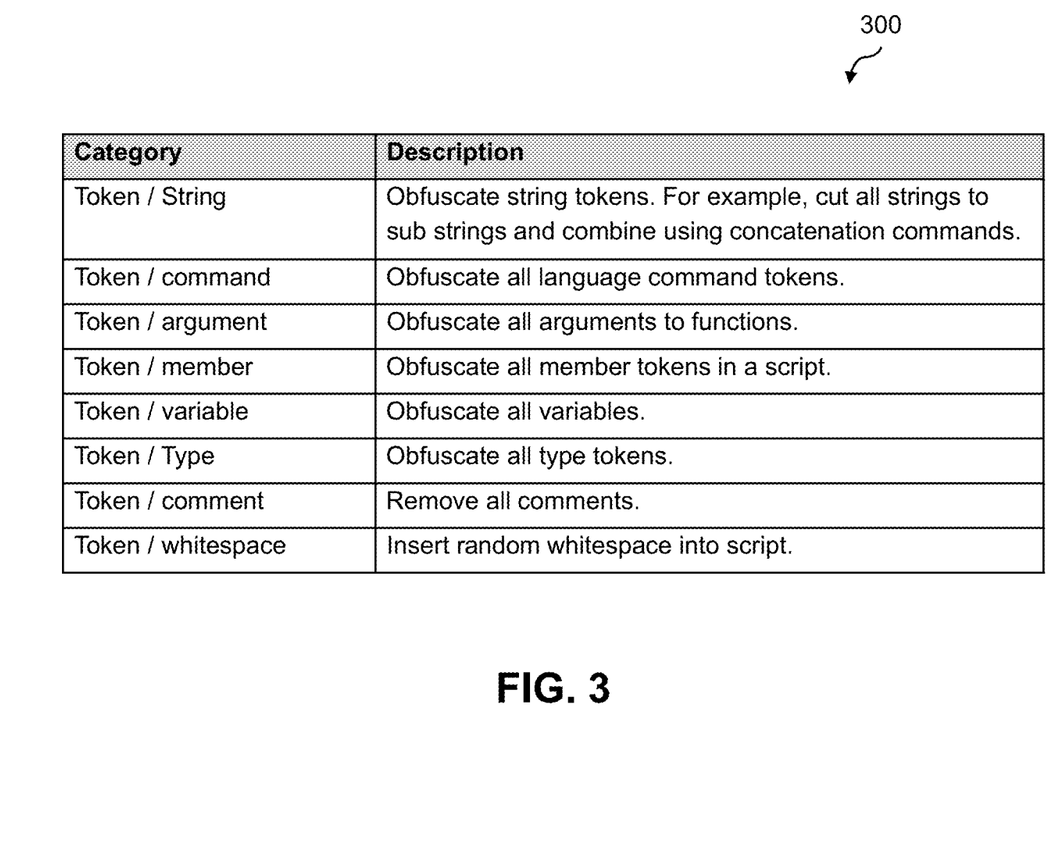
FIG. 3 shows a table illustrating methods for obfuscation in an illustrative embodiment.

There are a number of ways in which code can be obfuscated to bypass known de-obfuscation techniques. For example, the PowerShell Obfuscator, available from GitHub, has four different obfuscation categories, with multiple subcategories. The first category of the PowerShell Obfuscator tool is token-based obfuscation, which has eight sub-categories. FIG. 3 shows a table 300 of the different subcategories for token obfuscation in the PowerShell Obfuscator tool.

When running an obfuscation command or other tool, it is possible to use combinations of different techniques, such that the same input will produce different obfuscated output based on the different arguments provided to the obfuscation command or tool. As a result, it is difficult for automated tools to detect obfuscation.

To move beyond pattern matching and better capture inherent features of obfuscated code, embodiments leverage a deep learning model to model obfuscated files versus non-obfuscated files. In some embodiments, the deep learning model uses a bi-directional LSTM network with three convolutional layers and 800,000 parameters overall. The network architecture of the deep learning model combines a feature generating component via the convolutional layers and a memory component via the LSTM network. A final layer in the network architecture acts as the final classifier given preprocessed features from previous layers. The advantages of this network architecture in detecting obfuscation include the ability to input raw text with no feature engineering while providing highly accurate classification.

The deep learning model used in some embodiments is trained on a large number of obfuscated and non-obfuscated files to be able to distinguish between them. The training set may include known obfuscated files, possibly complemented with obfuscated files generated using obfuscation tools. In the test results described below, thousands of obfuscated PowerShell scripts were generated, leveraging many types of categories and sub-categories to make files look different and not fall into a local minima. After training, the performance of the deep learning model was compared with classification using entropy, term frequency-inverse document frequency (TF-IDF) and Bag of Words techniques. Test results show that the deep learning model has high accuracy and recall compared to such other models.

Figure 4:
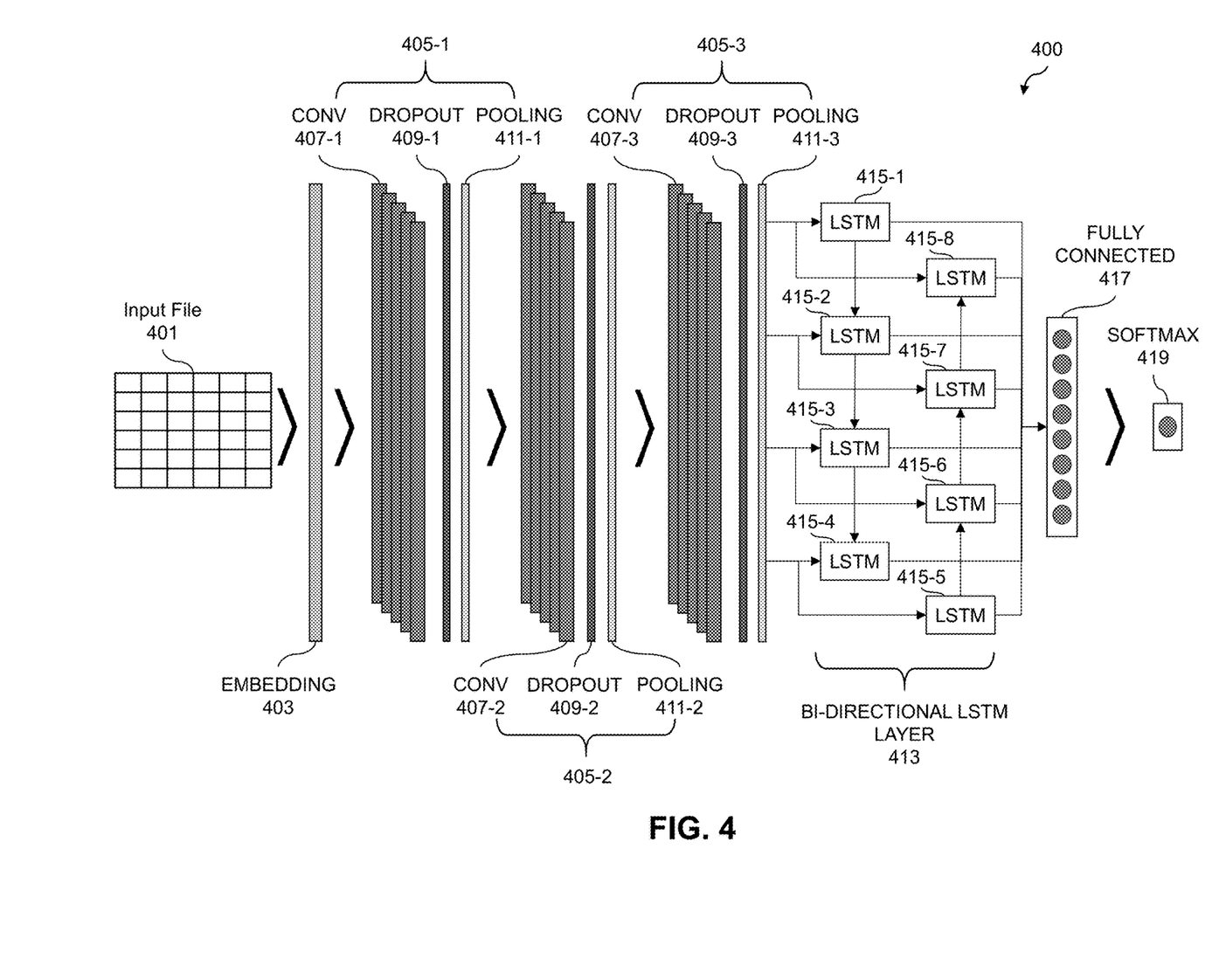
FIG. 4 shows an example architecture for a neural network used in detecting code obfuscation in an illustrative embodiment.

Feature representation for feeding script files into the neural network will now be described. In some embodiments, a character-level model is used to address obfuscation in feature representation. All characters used in the corpus (or vocabulary) of all files are recorded, and each character is indexed. When given an input script file, the file is converted into an index representation using an embedding layer to represent each character. FIG. 4 shows an architecture that comprises a stack of a convolutional neural network (CNN), LSTM and a deep neural network (DNN), which is referred to herein as CLDNN architecture 400. The CLDNN architecture 400 receives an input file 401 that is passed to an embedding layer 403. The input file 401 may represent a script file, some portion thereof, or more generally computer programming code to be classified.

The embedding layer 403 may be 32-bit. In some embodiments, an entire script file forms the input file 401 that is passed to the embedding layer 403 for classification by the CLDNN architecture 400. In other embodiments, a portion of a script file forms the input file 401 that is passed to the embedding layer 403 for classification by the CLDNN architecture 400. An entire script file, in some cases, is not necessary to determine whether the code in that script file is obfuscated or if it has a non-obfuscated or standard code structure. Test results, for example, indicate that utilizing the first 10,000 characters of the script file is in most cases sufficient to detect if a script file is obfuscated. The particular number of characters of a script file that are passed to the deep learning network, however, is not limited to 10,000 but instead may vary as desired. For example, the particular number of characters may be selected based on available computational resources.

The embedding layer 403 is configured to represent each character in the input file 401 (or each character in some designated portion of the input file 401 such as the first X characters of the input file 401) in a vector of scalars. This vector, when learned using stochastic gradient descent (SGD), changes to assign similar values to characters that have higher probability to follow or be followed by another character that is most likely to exist in standard or non-obfuscated code versus obfuscated code. This representation learning is similar to natural language processing (NLP) or speech recognition tasks where similar words or sounds can have similar numeric representations.

In the CLDNN architecture 400, the embedding provided by embedding layer 403 may be considered similar to an n-gram analysis, with characters of the input file 401 as tokens. In the case of an LSTM, however, the "n" value (e.g., then for n-grams) is not static but changes by how much the LSTM is required to remember according to the training set and training procedure of the network. Advantageously, this allows the CLDNN architecture 400 to decide upon training the length of optimal sequences of characters to distinguish between obfuscated and non-obfuscated code.

RNNs, in particular LSTMs, can be deployed for speech recognition, language models and different kinds of sequence modeling. The CLDNN 400 stacks multiple convolutional layers in blocks 405-1, 405-2 and 405-3 (collectively, blocks 405). Each block 405 includes a convolutional layer (407-1, 407-2 and 407-3, respectively, collectively convolutional layers 407), a dropout layer (409-1, 409-2 and 409-3, respectively, collectively dropout layers 409), and a pooling layer (411-1, 411-2 and 411-3, respectively, collectively pooling layers 411). Stacking the blocks 405 combines the ability to reduce parameters, provide regularization and improve the diminishing gradient problem as will be described in further detail below.

The CLDNN architecture 400 further includes a bi-directional LSTM layer 413, which comprises a plurality of LSTM cells 415-1 through 415-8 (collectively LSTM cells 415), for sequence identification. The LSTM cells 415 are examples of memory units of a recurrent layer in a RNN. The bi-directional LSTM layer 413 is followed by a fully connected layer 417. The last layer 419, also referred to herein as an output layer 419 or softmax layer 419, provides classification. The CLDNN architecture 400 can provide improved performance in some embodiments, such as performance increases of 6% relative to LSTM networks which do not stack a CNN network.

The CLDNN architecture 400 uses a recurrent bi-directional neural network with 1D convolutional layers 407. The CLDNN architecture 400 is capable of translating long sequences of characters in script files to features, similar to translation of audio to text.

For training the CLDNN architecture 400, SGD may be used, with an optimizer such as the Adam optimizer. Various other optimizers, however, may be used such as RMSProp, Eve, adagrad, etc. The CLDNN architecture 400 may be trained on scripts containing obfuscated code and non-obfuscated code. Relatively small amounts of dropout may be used in the dropout layer 409 for regularization, since good convergence and small differences between training and test sets are observed. The first layer of the CLDNN architecture 400, as mentioned above, is the embedding layer 403, which allows for good character representation by adding contextual information and projecting embedding vectors onto a new plane that is more relevant to the cost function.

While three blocks 405 are shown in the CLDNN architecture 400, embodiments are not so limited. Depending on the input size, the amount of data, computation constraints, etc., different numbers of blocks 405 may be used.

The convolutional layers 407 each apply a specified number of convolution filters to the input file 401. The convolutional layers 407 learn filters that activate when the network detects a specific type of feature in the input file 401. In some embodiments, the convolutional layers 407 apply ReLU activation functions to the output to introduce nonlinearities, thus improving the diminishing gradient problem. The convolutional layers 407 also provide the ability to reduce parameters.

The dropout layers 409 "drop out" random sets of activations in the convolutional layers 407 by setting them to zero. The dropout layers 409 alleviate the problem of overfitting, where weights in the network are tuned to the training data to an extent that its performance is reduced when given new data.

The pooling layers 411 provide for non-linear downsampling. Various non-linear functions may be utilized in the pooling layers 411. In some embodiments, the maxpooling function is used, which partitions the input into sub-regions, and outputs the maximum for each sub-region. The pooling layers progressively reduce the size of the representation of the input, reducing the number of parameters and computation.

The bi-directional LSTM layer 413 provides for sequence identification. The use of bi-directional LSTM cells 415 in the bi-directional LSTM layer 413 is possible since the CLDNN architecture 400 operates in batch mode on a sequence of predefined characters (e.g., a portion of the code in the input file 401). The bi-directional LSTM layer 413 looks at each character, and sees preceding and successive characters to put it into context. If the character in question looks out of place, like it would in an obfuscated file, the probability distribution of the output changes towards an obfuscation classification. As illustrated in FIG. 4, neurons from the last block 405-3 are split in two directions, a first direction for forward states (e.g., representing successive characters) including cells 415-1, 415-2, 415-3 and 415-4, and a second direction for backward states (e.g., representing preceding characters) including cells 415-5, 415-6, 415-7 and 415-8. As shown, the cell 415-1 has an output connected to an input of cell 415-2, the cell 415-2 has an output connected to an input of the cell 415-3, and the cell 415-3 has an output connected to an input of the cell 415-4. The cell 415-5 has an output connected to an input of cell 415-6, the cell 415-6 has an output connected to an input of cell 415-7, and the cell 415-7 has an output connected to an input of cell 415-8. Outputs of the cells 415-1 through 415-4 are not connected to inputs of the cells 415-5 through 415-8, and vice versa.

After sequence identification in the bi-directional LSTM layer 413, the data is passed to fully connected layer 417. The fully connected layer 417 is used in neural networks that act as classifiers, and has neurons with connections to all activations in the bi-directional LSTM layer 413, such as to each LSTM cell 415 in the bi-directional LSTM layer 413. The last layer in the CLDNN architecture 400 is an output layer 419, which provides the classification. In some embodiments, the output layer 419 is a softmax layer 419 which provides the classification algorithm, and outputs to one softmax neuron that does the prediction. The CLDNN architecture 400 outputs a number between 0 and 1, which represents the confidence level of the CLDNN architecture 400 in classifying the input file 401 as containing obfuscated code, where 1 represents an obfuscated input and 0 represents non-obfuscated input.

The output layer 419 in some embodiments may contain multiple neurons to provide multiple confidence levels. For example, the CLDNN architecture 400 may be configured to detect multiple specified types of obfuscation, and each softmax neuron in the output layer 419 may be configured to output a value representing the confidence level that an input file is using a particular type of obfuscation. This may be useful, for example, in cases where it is determined that particular types of obfuscation are associated with malicious or benign scripts. As discussed above, obfuscation may be used for legitimate purposes, such as in compressing a script or other code for transfer. The output layer 419 of the CLDNN architecture 400 may be configured with one or more softmax neurons that provide one or more outputs indicating the confidence level of certain types of obfuscation determined to be malicious, as well as one or more softmax neurons that provide an output indicating the confidence level of certain types of obfuscation determined to be benign. To classify the input file 401 in embodiments with multiple output confidence levels, various techniques may be used. In some cases, the input file 401 is classified as the output with the highest confidence level. In other cases, the input file 401 may be classified as malicious if any of the output values for malicious types of obfuscation exceeds a corresponding threshold.

Various parameters may be used for the different layers in the CLDNN architecture 400. While an example parameter configuration is described below, it is to be appreciated that various other parameters may be used depending on the desired configuration of the CLDNN architecture 400, such as based on available computation resources, the size of the data, etc. The first convolutional layer 407-1 may have an output shape or tensor (e.g., an n-dimensional array) of 10000×196 convolutional filters. The second convolutional layer 407-2 may have an output shape of 5000×196 filters, and the third convolutional layer 407-3 may have an output shape of 2500×256 filters. Each of the dropout layers 409 may be configured with a dropout rate of 0.1, and each of the pooling layers 411 may be configured as a maxpooling layer with window size p=2. The bi-directional LSTM layer 413 may be configured with 128 LSTM cells 415 (although only eight cells denoted 415-1 through 415-8 are shown in FIG. 4 for clarity). The fully connected layer 417 has 128 neurons, one for each LSTM cell 415 in the bi-directional LSTM layer 413. The output layer 419, as described above, may have a single neuron which utilizes a softmax function for outputting a value between 0 and 1 indicating a confidence level of classifying the input file 401 as containing obfuscated code.

The CLDNN architecture 400, configured with the parameters described above, was tested using 3,500 samples and validated with 1,715 samples with a 52%/48% non-obfuscated/obfuscated split. The training samples were PowerShell scripts.

PowerShell includes a command-line shell with a scripting language built on the .NET Framework and .NET Core. The PowerShell scripting language was created to help system administrators perform tasks in a more efficient and programmatic way, similar to Unix based systems. The PowerShell scripting language is destined to replace the command line in Microsoft® Windows systems completely in the future, and is more powerful than the DOS command line. PowerShell allows for access to all Windows operating system (OS) primitives, including the registry, .NET application programming interfaces (APIs), WIN32 APIs, network and disk.

As a result of PowerShell's abilities, attackers have begun utilizing the PowerShell scripting language in attack vectors. The appeal of using PowerShell, to an attacker, lies in the fact that PowerShell is already installed on Windows machines by default since 2007. Some attack methodologies using PowerShell are referred to as "living off the land" where the attacker uses only tools that are available to administrators and that leave no footprint on the target machine. This includes execution of code from memory without touching the disk, and attaching malicious code to existing dynamic link libraries (DLLs) in memory to avoid opening new processes.

Attackers may use PowerShell in various different attack vectors. PowerShell may be used inside Office documents with Macros. PowerShell may also be used as part of a lateral movement attack, where an attacker wishes to execute code inside a remote host during the network expansion phase. PowerShell may also be used for covert execution of malicious code. Since PowerShell is able to execute code from memory, attackers can download more malicious PowerShell code and execute such code on-the-fly.

The PowerShell Obfuscator tool described above was used to obfuscate PowerShell files to generate the training set. The training set included 1,829 non-obfuscated files and 1,671 obfuscated files. The test set included 914 non-obfuscated files and 801 obfuscated files.

Figure 5:
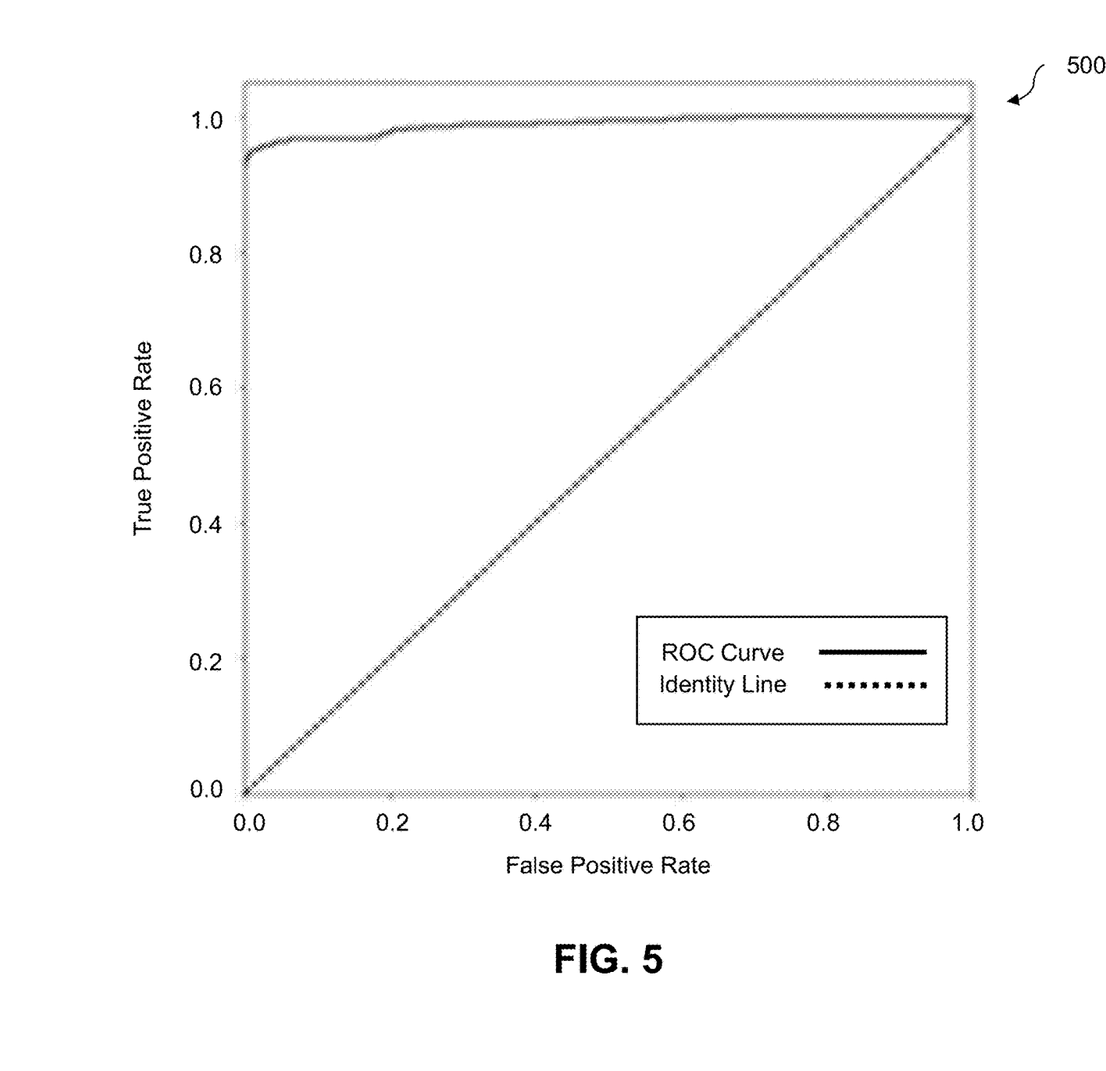
FIG. 5 shows a plot illustrating classification results in an illustrative embodiment.
Figure 6:
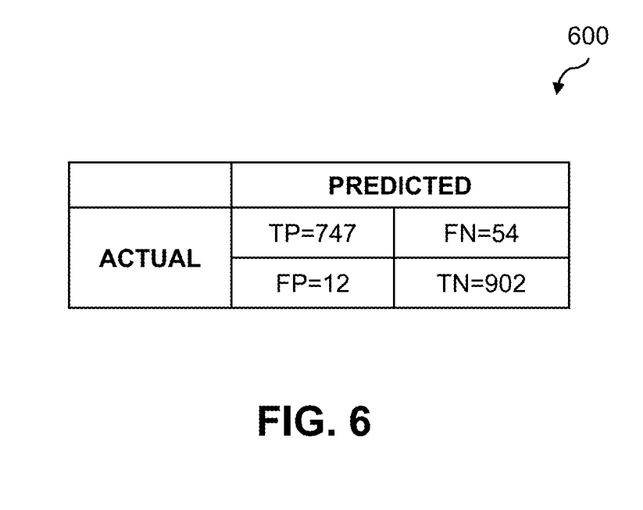
FIG. 6 shows a table illustrating classification results in an illustrative embodiment.

FIG. 5 shows a relative operating characteristic (ROC) curve plot 500 obtained using the test set. In the ROC curve plot 500, the solid line shows the ROC curve. FIG. 6 shows a confusion matrix 600 obtained using the test set. In the confusion matrix 600, TP represents true positive, FP represents false positive, TN represents true negative and FN represents false negative. As shown in FIGS. 5 and 6, the CLDNN architecture 400 exhibits very high accuracy with a low false positive rate. The CLDNN architecture 400 is a deep learning model which can be extended both in the depth of the architecture (such as in increasing the number of blocks 405) and in the amount of data used for training, each of which has the potential to improve performance.

Detection of obfuscation of programming languages or code may be done using entropy calculations, such as a Shannon entropy calculation $$H(X) = \sum_{i=1}^{n} P(x_i)I(x_i) = -\sum_{i=1}^{n} P(x_i)\log_b P(x_i),$$

where $P(x_i)$ is the probability of character number i showing up in a stream of characters of the given script or other input file. This approach calculates the sum of log probabilities times the probability of each character to appear in the document. This eventually gives a measure of disorder or uncertainty of the given script.

Utilizing entropy-based approaches for detecting obfuscation, however, can fail in many instances where obfuscation is tailored to avoid entropy calculations. This is common in tools targeted to malware avoidance. For example, an obfuscation tool could add spaces into obfuscated text, which will reduce the overall entropy of a script file.

Other machine learning tools, such as classifiers with handcrafted feature sets, can be used to predict obfuscation. For example, the number of strings or commas in a certain script may be counted and used to create a model that is able to distinguish obfuscation given the number of characters in a script. Such approaches, however, fail in edge cases when the obfuscation is capable enough to change tactics, such as using combinations of categories of token-based obfuscation shown in table 300. In many cases, obfuscation tools will perform token-based obfuscation, which avoids certain feature sets and thus makes machine learning models that rely on handcrafted features sets fail.

Embodiments provide a number of advantages relative to approaches which utilize entropy calculations or handcrafted feature sets. In some embodiments, there is no feature engineering for classification. The RNN, such as the CLDNN architecture 400, learns features automatically during training. Since there are no static features, it is difficult for the attacker to "learn" the features and make an attack that circumvents them. Also, since embodiments utilize deep learning models, more data increases the accuracy by definition. This ability, combined with the capability to generate more data via obfuscation tools, allows for nearly endless data for training and thus improves the classification performance. Further, even with relatively small amounts of data, the deep learning models such as the CLDNN architecture 400 exhibit accurate classification performance.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
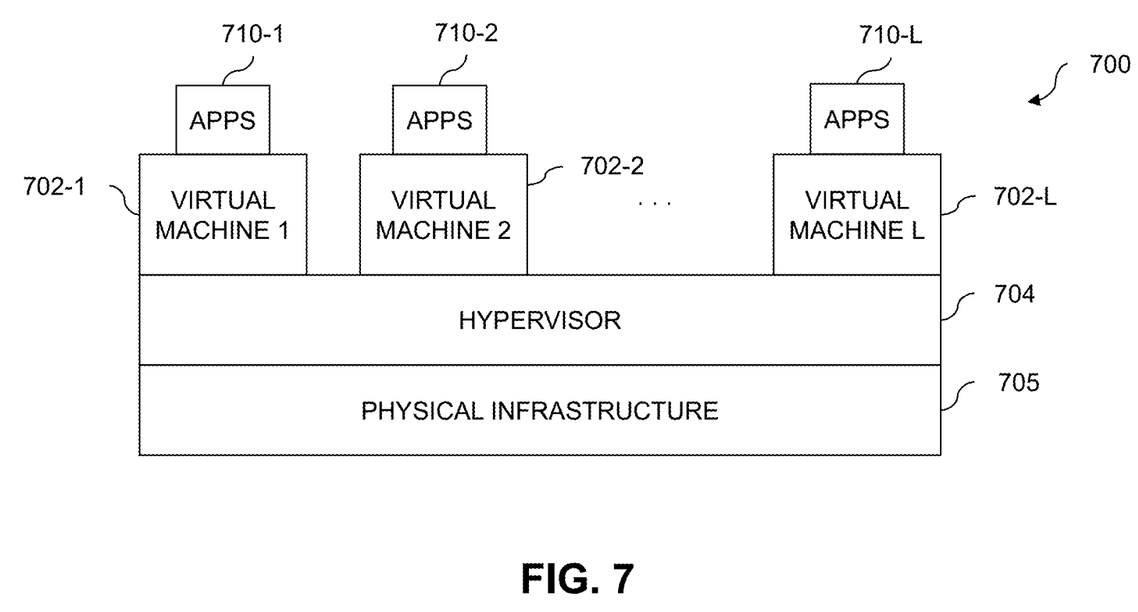
FIGS. 7 and 8 show examples of processing platforms that may be utilized to implement at least a portion of the FIG. 1 system.
Figure 8:
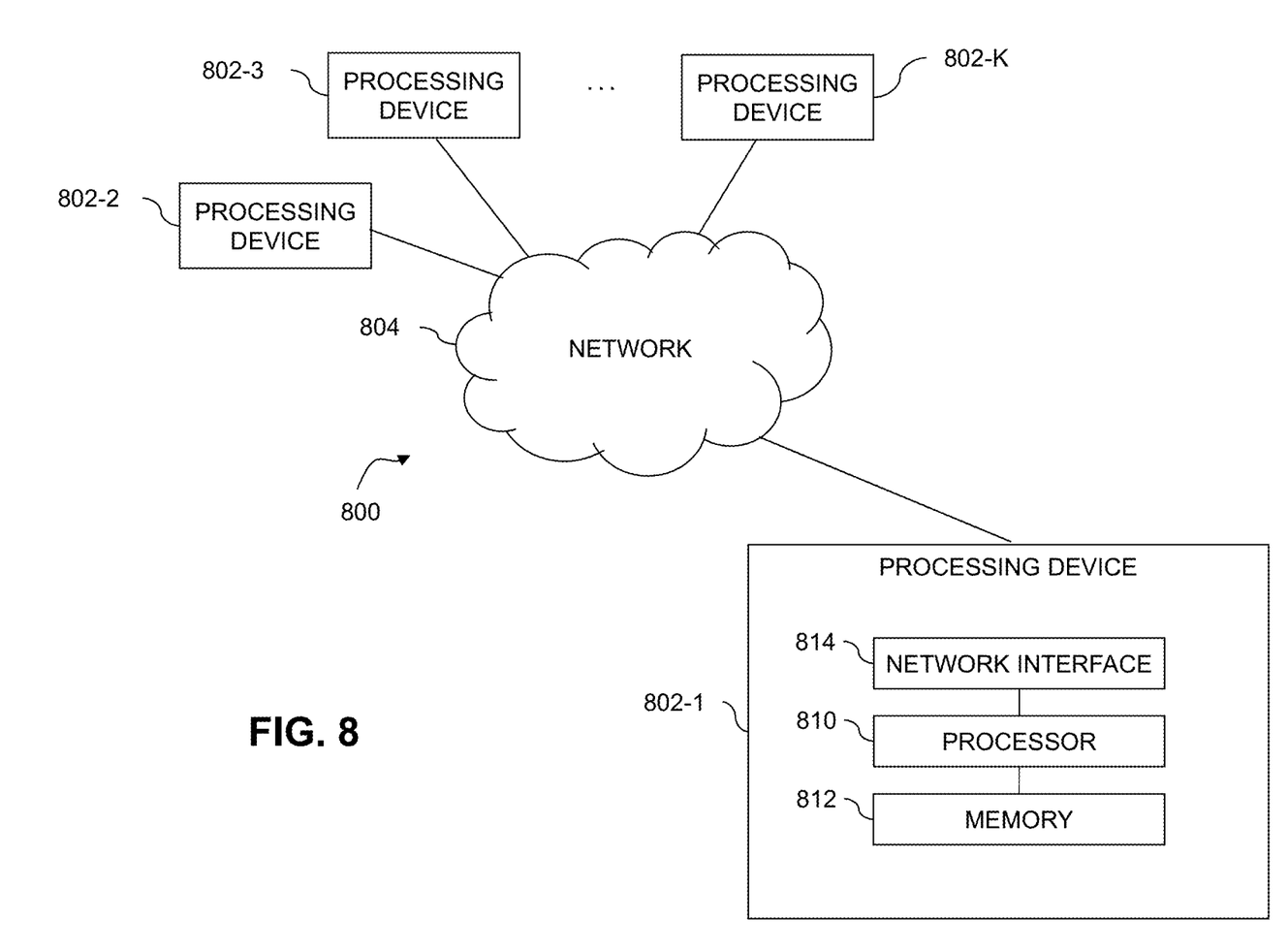

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement classification functionality as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality described herein for classifying software scripts are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide the classification functionality described herein. Also, the particular configurations of system and device elements shown in the figures can be varied in other embodiments. Thus, for example, the particular type of software modules deployed in a given embodiment and their respective configurations may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
   generating an index representation of characters in at least a given portion of code of a given file;
   mapping the index representation to a vector space providing contextual representation of the characters utilizing an embedding layer of a recurrent neural network, the embedding layer representing each of a plurality of characters in the given portion of the given code file as an entry in a vector of scalars, the vector of scalars assigning a given value to a given entry for a given character based at least in part on a probability of the given character following or being followed by another character having a designated code type;
   identifying one or more code features in the mapped index representation utilizing at least one hidden layer of the recurrent neural network;
   detecting sequences of the identified code features in the mapped index representation utilizing a plurality of memory units of a recurrent layer of the recurrent neural network;
   generating a classification result for the given file based on the detected sequences of code features utilizing one or more classification layers of the recurrent neural network;
   utilizing the classification result to determine if the given file contains code of the designated code type; and
   modifying access by a given client device to the given file responsive to determining that the given file contains code of the designated code type;
   wherein the at least one hidden layer comprises a sequence of two or more hidden layers;
   wherein a given one of the sequence of two or more hidden layers comprises a set of filters configured to detect one or more features in the mapped index representation; and
   wherein the method is performed by at least one processing device comprising a processor coupled to a memory.

2. The method of claim 1 wherein the designated code type comprises obfuscated code.

3. The method of claim 1 wherein the given file comprises a script file.

4. The method of claim 1 wherein generating the index representation comprises:
   creating a corpus of each character in the code of a plurality of files including the given file;
   assigning an index to each character in the corpus; and
   generating an array comprising indexes of the corpus which correspond to the characters in the given portion of the code of the given file.

5. The method of claim 1 wherein the given portion of the code of the given file comprises a designated number of characters of the code of the given file less than all of the characters of the code of the given file.

6. The method of claim 1 wherein at least a given one of the sequence of two or more hidden layers comprises a convolutional layer.

7. The method of claim 6 wherein the convolutional layer comprises two or more convolution filters configured to detect one or more features in the mapped index representation.

8. The method of claim 7 wherein the convolutional layer applies Rectified Linear Units (ReLU) activation functions to its output.

9. The method of claim 7 wherein the given hidden layer further comprises a dropout layer configured to drop out random sets of activations in the convolutional layer.

10. The method of claim 7 wherein the given hidden layer further comprises a pooling layer configured to provide non-linear down-sampling of the output of the convolutional layer.

11. The method of claim 1 wherein the plurality of memory units of the recurrent layer comprise a plurality of long short-term memory (LSTM) cells arranged in a bi-directional network.

12. The method of claim 1 wherein the one or more classification layers comprise:
   a fully connected layer comprising neurons with connections to each of the memory units in the recurrent layer; and
   an output layer comprising at least one neuron that generates a representation of a confidence level of the recurrent neural network in classifying the given portion of the code of the given file as comprising code of the designated code type.

13. The method of claim 1 wherein modifying access by the given client device to the given file comprises at least one of:
   removing the given file from a memory or storage of the given client device;
   preventing the given client device from obtaining the given file; and
   causing the given file to be opened in a sandboxed application environment on the given client device.

14. A computer program product comprising a non-transitory processor-readable storage medium having stored therein program code of one or more software programs, wherein the program code when executed by at least one processing device cause the at least one processing device:
   to generate an index representation of characters in at least a given portion of code of a given file;

to map the index representation to a vector space providing contextual representation of the characters utilizing an embedding layer of a recurrent neural network, the embedding layer representing each of a plurality of characters in the given portion of the given code file as an entry in a vector of scalars, the vector of scalars assigning a given value to a given entry for a given character based at least in part on a probability of the given character following or being followed by another character having a designated code type;

to identify one or more code features in the mapped index representation utilizing at least one hidden layer of the recurrent neural network;

to detect sequences of the identified code features in the mapped index representation utilizing a plurality of memory units of a recurrent layer of the recurrent neural network;

to generate a classification result for the given file based on the detected sequences of code features utilizing one or more classification layers of the recurrent neural network;

to utilize the classification result to determine if the given file contains code of the designated code type; and to modify access by a given client device to the given file responsive to determining that the given file contains code of the designated code type;

wherein the at least one hidden layer comprises a sequence of two or more hidden layers; and wherein a given one of the sequence of two or more hidden layers comprises a set of filters configured to detect one or more features in the mapped index representation.

15. The computer program product of claim 14 wherein the designated code type comprises obfuscated code.

16. The computer program product of claim 14 wherein the given file comprises a script file.

17. An apparatus comprising:

at least one processing device comprising a processor coupled to a memory;

the at least one processing device being configured:

to generate an index representation of characters in at least a given portion of code of a given file;

to map the index representation to a vector space providing contextual representation of the characters utilizing an embedding layer of a recurrent neural network, the embedding layer representing each of a plurality of characters in the given portion of the given code file as an entry in a vector of scalars, the vector of scalars assigning a given value to a given entry for a given character based at least in part on a probability of the given character following or being followed by another character having a designated code type;

to identify one or more code features in the mapped index representation utilizing at least one hidden layer of the recurrent neural network;

to detect sequences of the identified code features in the mapped index representation utilizing a plurality of memory units of a recurrent layer of the recurrent neural network;

to generate a classification result for the given file based on the detected sequences of code features utilizing one or more classification layers of the recurrent neural network;

to utilize the classification result to determine if the given file contains code of the designated code type; and to modify access by a given client device to the given file responsive to determining that the given file contains code of the designated code type;

wherein the at least one hidden layer comprises a sequence of two or more hidden layers; and wherein a given one of the sequence of two or more hidden layers comprises a set of filters configured to detect one or more features in the mapped index representation.

18. The apparatus of claim 17 wherein the designated code type comprises obfuscated code.

19. The apparatus of claim 17 wherein the given file comprises a script file.

20. The method of claim 1 wherein assigning the given value to the given entry for the given character comprises:

identifying a given probability of the given character following or being followed by another character of the designated code type;

comparing the given probability with one or more additional probabilities of one or more additional characters following or being followed by another character having the designated code type; and assigning the given value such that a distance between the given value and each of one or more additional values for the one or more additional characters is proportional to differences between the given probability and the one or more additional probabilities.

* * * * *